US009248901B2

(12) United States Patent
Petit et al.

(10) Patent No.: US 9,248,901 B2
(45) Date of Patent: Feb. 2, 2016

(54) AIRFRAME STRUCTURAL ELEMENT (75) Inventors: David P Petit, Bristol (GB); Rizal Hafiz, Bristol (GB)

(73) Assignee: Airbus Operations Limited, Bristol (GB)

( * ) Notice: Subject to any disclaimer, the term of this patent is extended or adjusted under 35 U.S.C. 154(b) by 432 days.

(21) Appl. No.: 13/293,453

(22) Filed: Nov. 10, 2011

(65) Prior Publication Data

US 2012/0132755 A1 May 31, 2012

(30) Foreign Application Priority Data

Nov. 29, 2010 (GB) .................................. 1020185.3

(51) Int. Cl.
*B64C 3/18* (2006.01)
*B64D 37/00* (2006.01)
*F16L 5/12* (2006.01)
*F16L 27/12* (2006.01)

(52) U.S. Cl.
CPC .............. *B64C 3/187* (2013.01); *B64D 37/005* (2013.01); *F16L 5/12* (2013.01); *F16L 27/12* (2013.01); *Y10T 29/49* (2015.01)

(58) Field of Classification Search
CPC ............................... B64C 3/187; B64D 37/005
USPC .................................... 244/131, 135 R, 135 C
See application file for complete search history.

(56) References Cited

U.S. PATENT DOCUMENTS

| 1,996,281 | A | * | 4/1935 | Dolan | 244/55 |
| 2,681,778 | A | * | 6/1954 | Hughes | 244/135 R |
| 2,745,613 | A | * | 5/1956 | Oswald et al. | 244/76 R |
| 3,093,350 | A | * | 6/1963 | Wilkins | 244/203 |
| 4,330,100 | A | * | 5/1982 | Elber | 244/48 |
| 4,624,425 | A | * | 11/1986 | Austin et al. | 244/13 |
| 6,547,589 | B2 | * | 4/2003 | Magyar et al. | 439/535 |
| 6,736,354 | B2 | * | 5/2004 | Goto et al. | 244/135 C |
| 6,802,479 | B2 | * | 10/2004 | Howe et al. | 244/129.1 |
| 6,889,940 | B1 | * | 5/2005 | Howe | 244/135 R |
| 6,997,415 | B2 | * | 2/2006 | Wozniak et al. | 244/135 C |
| 7,073,751 | B1 | * | 7/2006 | Tighe et al. | 244/135 C |
| 2003/0218098 | A1 | * | 11/2003 | Goto et al. | 244/135 R |
| 2005/0044712 | A1 | * | 3/2005 | Gideon et al. | 29/897.32 |
| 2009/0025815 | A1 | * | 1/2009 | Becks et al. | 138/112 |
| 2010/0301177 | A1 | | 12/2010 | Guthke et al. | |
| 2010/0314866 | A1 | * | 12/2010 | Volchko | 285/194 |
| 2011/0147523 | A1 | * | 6/2011 | West et al. | 244/123.1 |

FOREIGN PATENT DOCUMENTS

| JP | 2005-121101 | 5/2005 |
| JP | 2006-097841 | 4/2006 |

OTHER PUBLICATIONS

Search Report for GB 1020185.3, dated Feb. 24, 2011.

* cited by examiner

*Primary Examiner* — Justin Benedik
(74) *Attorney, Agent, or Firm* — Nixon & Vanderhye P.C.

(57) ABSTRACT

An airframe structural element, such as an aircraft rib, is disclosed that comprises an integral pipe connector element for connecting pipes through the structural element. The pipe connection means provided by the pipe connector element may be aligned on a common axis with a pipe connection means provided by an adjacent airframe structural element.

21 Claims, 7 Drawing Sheets

AIRFRAME STRUCTURAL ELEMENT

This application claims priority to GB Patent Application No. 1020185.3 filed 29 Nov. 2010, the entire contents of which is hereby incorporated by reference.

FIELD OF INVENTION

The present invention relates to an airframe structural element.

BACKGROUND OF THE INVENTION

Many engineered structures such as aircraft, spacecraft, shipping and automotive structures comprise extensive pipework systems arranged for the transport of fluids. Such pipework systems may provide external or internal transport of fluids and are generally physically supported by elements of the relevant structure. For example, pipe-work is fixed to structural elements using clamps or other means. In some cases, the required route for a given pipe runs through openings or conduits in structural elements. Such openings or conduits are commonly employed as fixing points for the pipe-work. Pipe-work commonly comprises sections of pipes interconnected with pipe connectors. The pipe connectors are often combined with the fixing function for the pipe-work. In other words, pipe connectors are mounted on or fixed to structural elements, thus providing the required support for the pipe-work. The pipe connectors are then interconnected with lengths of pipe.

One problem with such pipe-work systems is that, in order to provide for the specific route of a given piece of pipe-work through the relevant structure, a large number of different connectors or pipe sections are required. Having such a large part count can increase the complexity and length of the assembly process. Furthermore, providing openings and any associated fixing points in structural elements in order to accommodate pipe connectors or sections effectively weakens those structural elements.

SUMMARY OF THE INVENTION

Embodiments of the invention provide an airframe structural element comprising: an airframe structural part; and a pipe connector element arranged to provide a conduit for fluid communication through the airframe structural part, the airframe structural part and the pipe connector element being integrally formed prior to the assembly of the airframe structural element into an airframe.

The pipe connection element may be orientated on a first common axis to a pipe connection means of a second pipe connector element provided on an adjacent second airframe structural part in the airframe so as to enable the pipe connector elements to be interconnected by a substantially straight pipe.

The pipe connector element may comprise a plurality of pipe connection means each orientated on a respective common axis to pipe connection means of a further pipe connector element on a respective further airframe structural element so as to enable the first and respective further pipe connectors to be interconnected by a respective substantially straight pipes. The first common axis is non-coincident with one or more of the further common axes.

The pipe connector element may comprise a plurality of male pipe connection means. The pipe connector element may comprise a male pipe connection means and a female pipe connection means, the female pipe connection means being arranged at least partially within the male pipe connection means. The airframe structural element may be arranged to provide a predetermined amount of float for connected pipes. The pipe connector element may comprise stopper means arranged to capture the connected pipes between respective pipe connector elements. The structural element may comprise a rib and the pipe connector element may provide a pipe connection through the web of the rib. The rib may be a wing rib.

Another embodiment provides a method for forming an airframe structural element, the method comprising the steps of:

forming an airframe structural part; and forming a pipe connector element integrally with the airframe structural part prior to the assembly of the airframe structural element into an airframe, the pipe connector element being arranged to provide a conduit for fluid communication through the airframe structural part.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
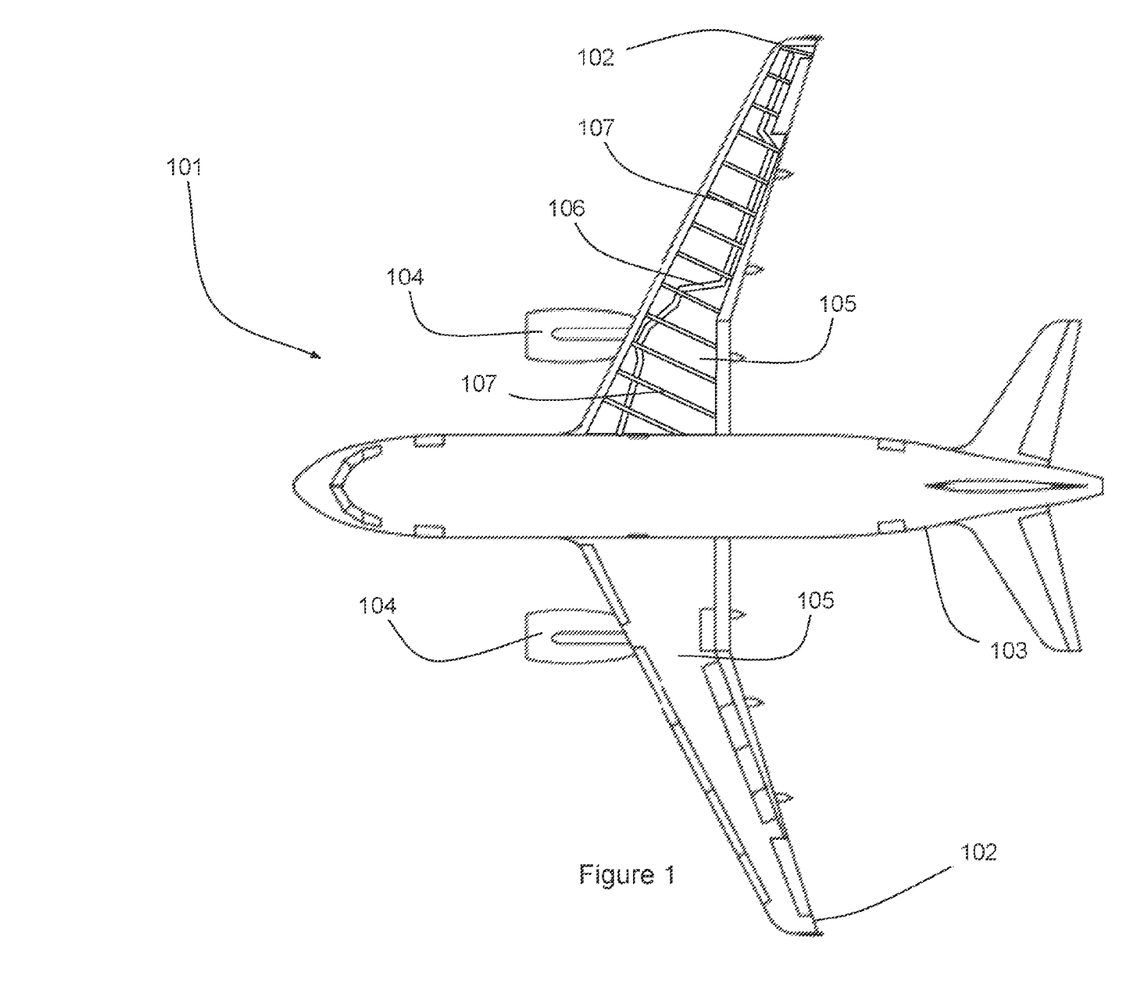
FIG. 1 is a schematic illustration of an aircraft.

With reference to FIG. 1, an aircraft 101 comprises a pair of wings 102 faired into a fuselage 103. In FIG. 1, the starboard wing 102 is shown omitting wing covers to reveal its internal structure. Each wing 102 carries an engine 104 and an internally located fuel tank system 105. The fuel tanks 105 are connected to the engines 104 by a set of fuel lines or pipes 106. The fuel pipes 106 are routed within the airframe of the aircraft 101 through airframe structural elements such as the ribs 107 of each wing 102. The fuel pipes 106 are constructed from lengths of pipes jointed using pipe connectors.

Figure 2:
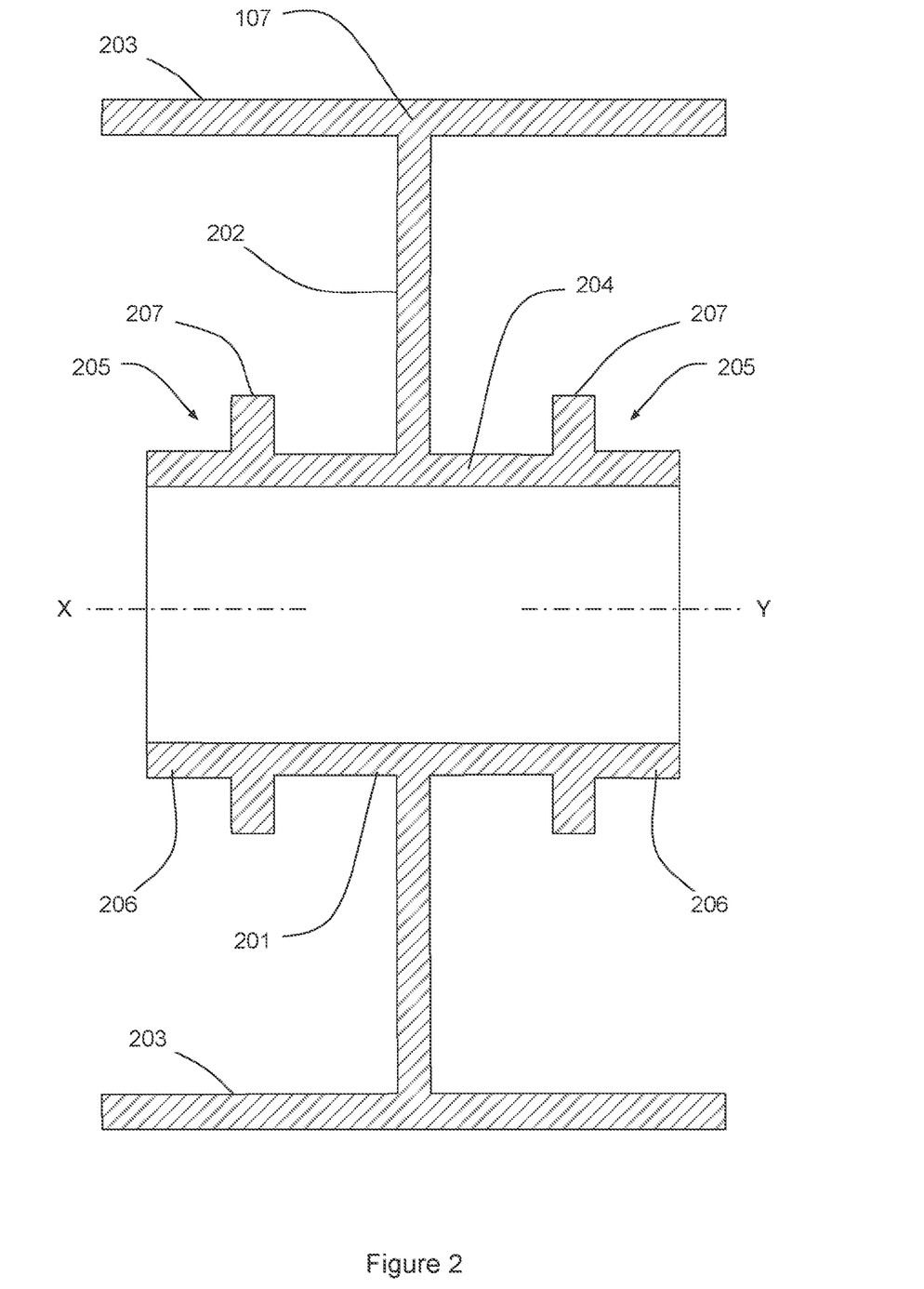
FIG. 2 is cross sectional side view of a structural element, in the form of a wing rib in the aircraft of FIG. 1, having an integral pipe connector element.

With reference to FIG. 2, selected pipe connectors comprises a pipe connector element 201 that is integral with one of the ribs 107. In other words, the airframe structural element in the form of the rib 107 comprises an airframe structural part and the integral pipe connector element 201. In the example of FIG. 2, the pipe connector element 201 is formed in the web 202 of the rib 107 generally midway between the rib feet 203. As will be understood by those skilled in the art, the location of the pipe connector element 201 is dependent on the design of the incident section of the relevant pipe run. The pipe connector element 201 provides a conduit for fluid communication through the rib 107. In the present embodiment, the pipe connector element 201 comprises a cylindrical body 204 having a male pipe connection means 205 at each end. Each pipe connection means 205 comprises a straight section of pipe 206 having a circumferential flange 207 on the outer surface. The flange 207 provides attachment means for a female pipe connection means described in further detail below.

In the present embodiment, each pipe connection means 205 is orientated or aligned on a common axis X, Y with corresponding respective pipe connection means of the adjacent pipe connector elements in the pipe run 106 so as to enable the pipe connectors to be interconnected by a substantially straight section of pipe. In the example of FIG. 2, the axes X, Y are perpendicular to the plane of the web 202 of the rib 107. In the present embodiment, the pipe connector element 201 and the rib 107 are integrally formed. In other words, the rib 107, comprising the pipe connector element 201, is machined from a single billet.

Figure 3:
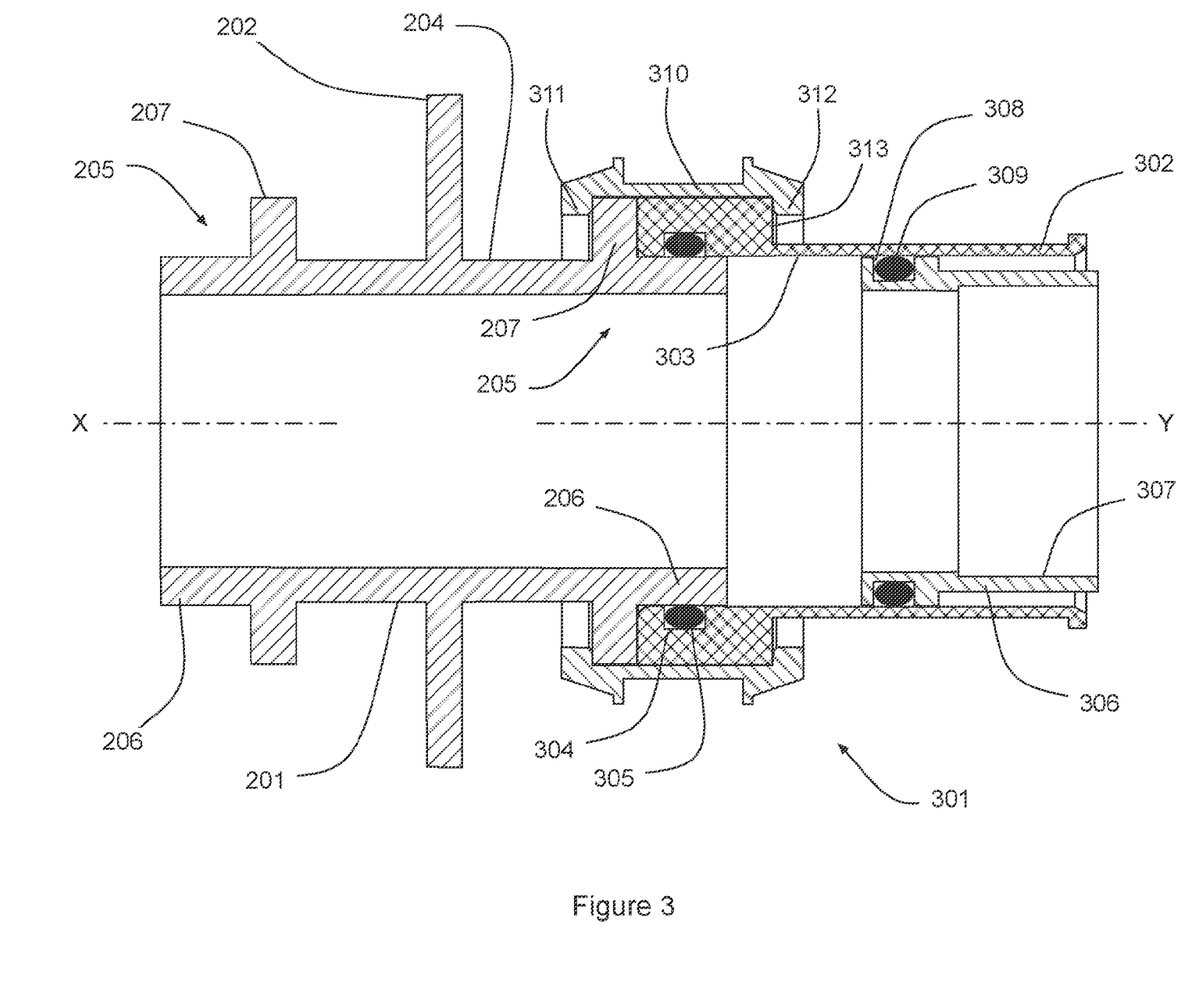
FIG. 3 is cross sectional side view of the pipe connector element of FIG. 2 and a connected pipe connection means.

With reference to FIG. 3, a female pipe connection means 301 is provided for connection to the male pipe connection means 205. The female pipe connector means 301 comprises a generally tubular body 302 having an internal bore 303 arranged at one end to conform to the outer surface of the male pipe connection means 205. The internal bore 303 comprises a seal seat 304 at its end adjacent the male pipe connection means 205 carrying a seal 305 arranged to provide a fluid tight seal between the body 302 and the male pipe connection means 205.

The female pipe connector means 301 further comprises an annular pipe collar 306 for fixing to a length of pipe (not shown). The pipe collar 306 is provided with a stopped or limited internal bore 307 into which a section of pipe may be sealingly fixed by bonding or other means. The pipe collar 306 is arranged to sit within the internal bore 303 of the body 302 and to be slidable therein along the axis X so as to provide a predetermined degree of float for a connected pipe. The outer surface of the pipe collar 306 is provided with a seal seat 308 at its inner end carrying a seal 309 arranged to provide a fluid tight seal between the internal bore 303 of the body 302 and the pipe collar 306. In the present embodiment, the seat 308 is further arranged to provide up to 4 degrees of angular deflection for the pipe collar 306 and any attached pipe.

A ring clip 310 is provided for coupling the female pipe connection means 301 to the male pipe connection means 205. The clip 310 comprises an annular body having an inwardly projecting flange 311, 312 on each outer end of its internal surface. The flanges are respectively arranged to sit over the flange 207 of the male pipe connection means 205 and a further flange 313 on the outer surface of the female pipe connection means 301. Thus, the clip 310 fixes the female pipe connection means 301 male pipe connection means 205 together as shown in FIG. 3. The clip 310 is arranged to be removable to enable the dismantling of the pipe connector.

Figure 4:
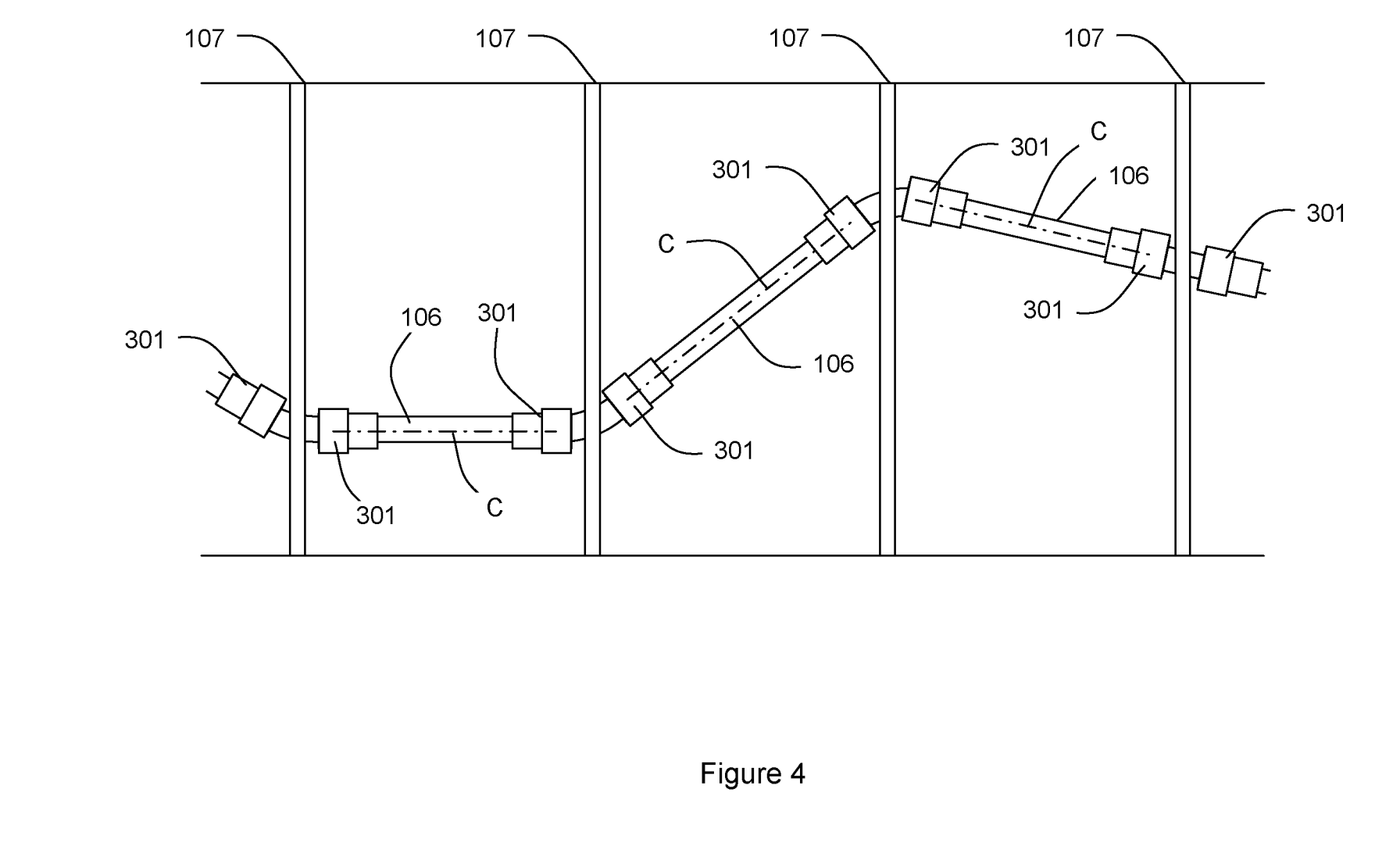
FIG. 4 is a schematic top view of a section of fuel pipe in the aircraft of FIG. 1.

The body 204 of the pipe connector is arranged to orientate each of the pipe connection means 205 on respective axes X, Y. In the present embodiment, the axes X, Y are each arranged normal to the plane of the web 202. FIG. 4 illustrates one of the fuel pipe runs of the aircraft 101 showing further embodiments of the invention in which the body member 204 of each pipe connector element 201 is formed so as to align each pipe connection means 205 on a common axis A with the neighbouring connection means 205 on an adjacent rib 107. Such alignment of the connection means 205 enables the pipe connectors to be interconnected with straight sections of pipe 106. Furthermore, while each pipe connection element 201 and integral structural element 107 may be unique, a set of identical female pipe connection means 301 is utilised. In other words, the female connection means 301 are a standard part for the pipe run 106. Having a common female connection means 301 instead of specific parts for each connection results in a simplification the assembly process.

Figure 5:
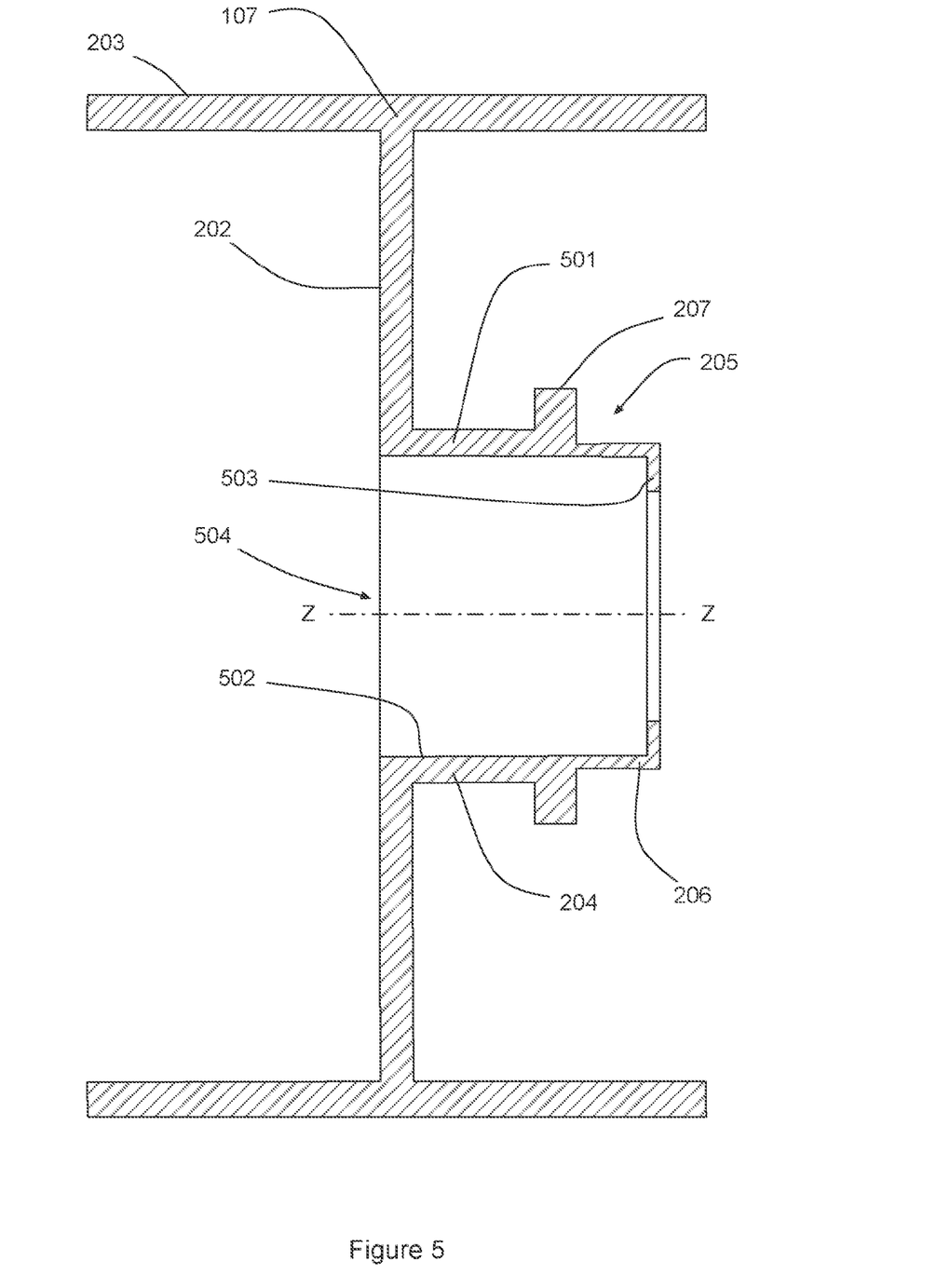
FIG. 5 is cross sectional side view of a structural element, in the form of a wing rib in the aircraft of FIG. 1, having an integral pipe connector element in accordance with another embodiment of the invention.

In another embodiment, with reference to FIG. 5, a pipe connector element 501 integral with a structural element in the form of a stringer 107 is provided. On one side of the stringer 107, the external features of the pipe connector element 501 are the same as those described above with reference to FIG. 2 and for such common elements, the same reference numbers are used. The pipe connector element 501 comprises a cylindrical body 204 extending from one side of the web 202 and having a first male pipe connection means 205 at its distal end. The first male pipe connection means 205 comprises a straight section of pipe 206 having a circumferential flange 207 on the outer surface. The flange 207 provides attachment means for a first female pipe connection means described in further detail below. The body member 204 has an internal cylindrical bore 502 that ends to an internal flange 503 at the distal end of the body member. Together, the bore 502 and flange 503 comprise a second female pipe connection means 504. In the present embodiment, both the first male and second female connection means 205, 504 share a common axis Z.

Figure 6:
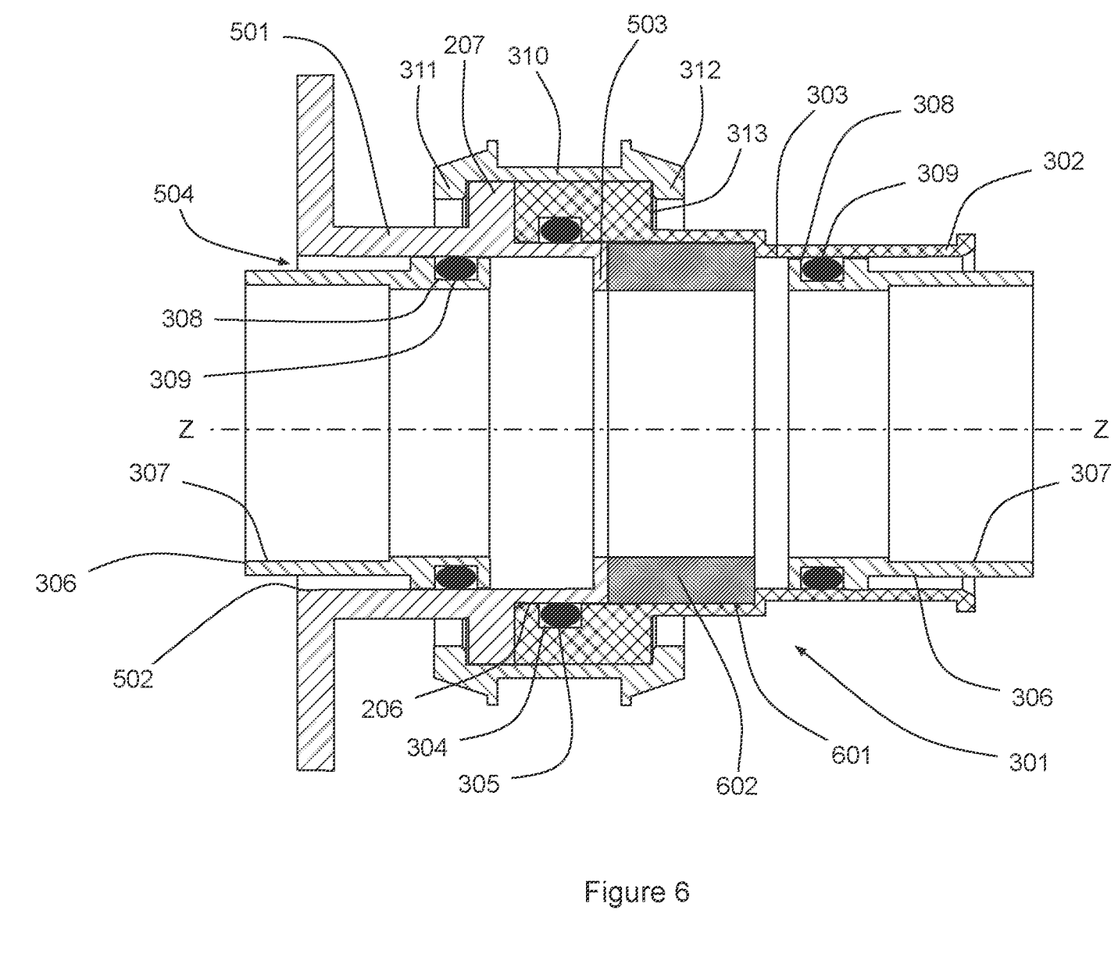
FIG. 6 is cross sectional side view of the pipe connector of FIG. 5 and two connected pipe connection means.

With reference to FIG. 6, the internal bore 502 of the female pipe connector means 504 is arranged to house a second pipe collar 306 which, in effect, comprises a second male pipe connection means. The pipe collar 306 is arranged to sit within the internal bore 303 of the body 302 and to be slidable therein along the axis Z so as to provide a predetermined degree of float for a connected pipe.

In the present embodiment, the internal bore 303 of the first female pipe connection means 301 is lengthened along the axis Z so as to accommodate a seat 601 carrying an annular stopper 602. The stopper 602 is arranged so as to trap a connected pipe between the respective first and second female pipe connection means 301, 502 of two adjacent pipe connectors. This is arranged to avoid the pipe from disengaging from one pipe connector at the extremes of its float.

In the present embodiment, each pipe connection means 205 is orientated or aligned on a common axis Z perpendicular to the web 202. As will be understood by those skilled in the art, the orientation of the axis Z to the web 202 may be determined so as to be aligned with a straight pipe run to be routed through the rib at any required angle.

Figure 7:
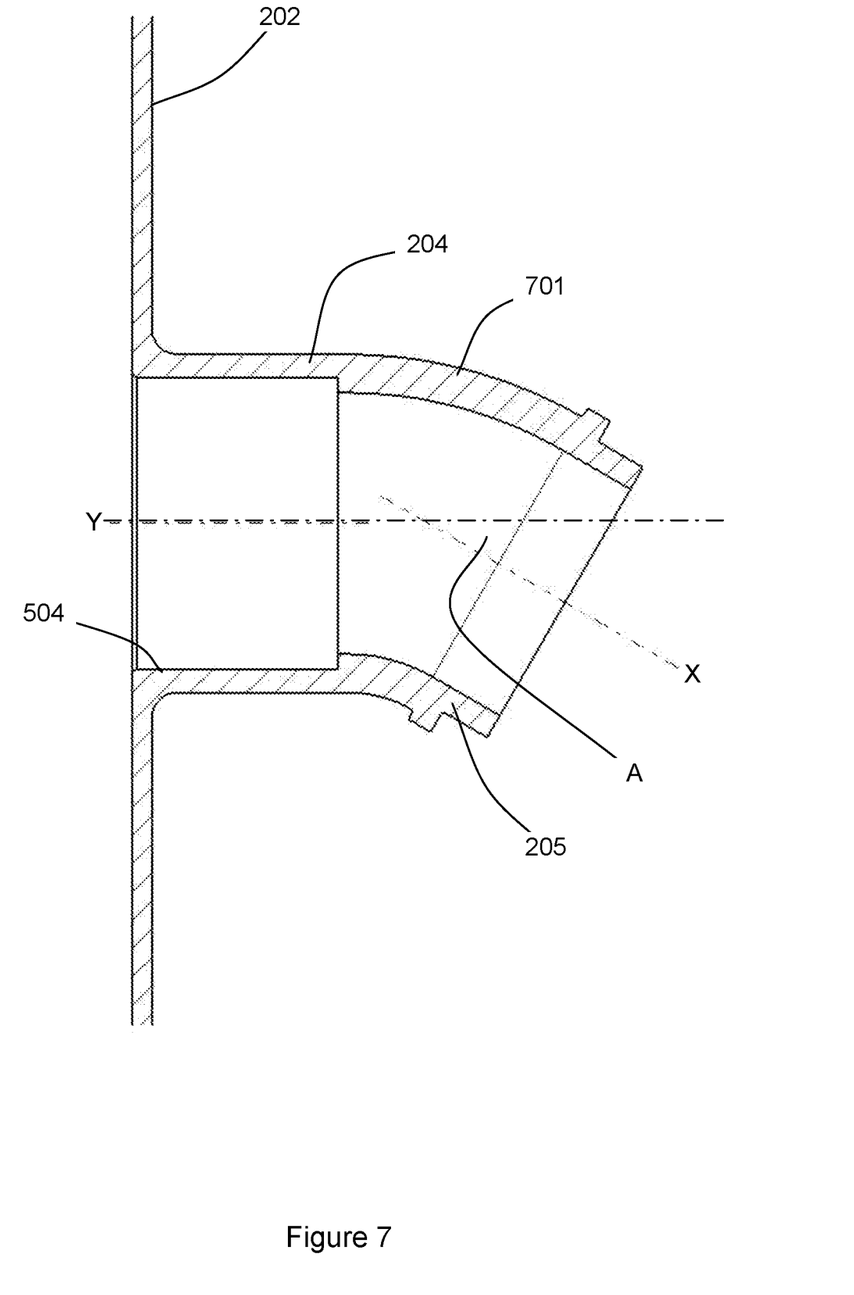
FIG. 7 is cross sectional side view of a structural element, in the form of a wing rib in the aircraft of FIG. 1, having an integral pipe connector element in accordance with a further embodiment of the invention.

In another embodiment, with reference to FIG. 7, the body 204 is elongated and curved on its central axis by a predetermined angle A with respect to the body 204 of FIG. 4. The body 204 is elongated so as to provide axial separation between the features of the first male and female connection means 205, 504. The curved section 701 of the body 204 is located between the first male and second female connection means 205, 504. Thus the first male and second female connection means 205, 504 are each oriented on distinct respective axes X, Y. As will be understood by those skilled in the art, the axes X, Y may be arranged at any suitable angle to the web 202 so as to enable the pipe connector to be interconnected with neighbouring pipe connectors by substantially straight sections of pipe.

As will be understood by those skilled in the art, the double sided pipe connector element, for example as shown in FIG. 2, may comprise all male pipe connection means, all female pipe connection means or any suitable combination thereof. As will be understood by those skilled in the art, the single sided pipe connector element, for example as shown in FIG.

5, comprises at least one female pipe connection means while the other pipe connection means may be male, as show in FIG. 5, or female.

In another embodiment, where the connected pipes are not bonded to the same rib and are formed from a metallic material and the sockets 303 are made of highly resistive or insulating material, the stopper 602 may formed from an electrically insulating material and arranged to maintain a minimum separation between the respective pipes so as to avoid electrical arching between the two attached pipe ends (not shown). In other words, where the connected pipes are electrically isolated from each other, the stopper is arranged to maintain such isolation.

The seal arrangements described in relation to the embodiments above may be varied as required by a given application of the pipe connector. For example, with reference to the embodiment of FIG. 6, the seal 305 may be omitted.

As will be understood by those skilled in the art, elements of the integral pipe connector element that are subject to wear may be protected by any suitable means to reduce or remove the need for maintenance or repair of the pipe connector element or structural element. For example, surfaces of a female pipe connection means may be provided with a replaceable bush.

As will be understood by those skilled in the art, the pipe connector element may be positioned anywhere in the web of the rib between the feet. Indeed, the pipe connector element may be provided in any suitable structural element.

As will be understood by those skilled in the art, the pipe connectors described herein may be applied to any suitable pipe installation or system for carrying any suitable substance.

As will be understood by those skilled in the art, the pipe connector element may comprise a manifold.

Embodiments of the invention enable the pipe connection means that are connected to the pipe connection element to be common throughout a given structure since the individual requirements of a given connection are provided by the pipe connection element integral with the relevant structural element. Having a common part significantly reduces the complexity and therefore the speed of the assembly process. The part count for the pipe run is also reduced. Where pipe runs are being installed in complex structures, such savings may be significant. When embodiments are compared to a pipe connector element that is provided by one or more distinct pieces that are fixed either side of a hole in the structural element, further improvements in assembly complexity may be provided. The size of the opening in the structural element created in embodiments of the invention may be reduced when compared to distinct pipe connectors fitted within such an opening.

As will be understood by those skilled in the art, the pipe connector element may be integrated with the structural element by any suitable method. For example, the pipe connector element may be integrally formed with the structural element by being machined from a single metal billet or forming part of the same moulding or casting as the structural element. The pipe connector element may be fixed into a structural element during or after completion of the manufacture of the structural element. Methods of fixing may, for example, comprise casting, welding, bonding, freeze-fitting, pressing, stamping, or additive layer manufacturing (ALM). Where the structural element or the pipe connector element is formed from a composite material the fixing methods may, for example, comprise bonding, welding of thermoplastic composites, resin transfer moulding, HexMC™ moulding provided by the Hexcel™ Corporation, additive layer manufacturing (ALM) or expanded fitting systems such as the Flexmate™ system provided by the Fatigue Technology™ Corporation.

As will be understood by those skilled in the art, the pipe connector element may be formed from a small billet welded, for example by friction welding or other welding means, onto the rib billet and then machined at the connector location. This arrangement reduces billet cost and rib machining time when compared to machining the rib and connector element from a single large billet.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the scope of applicant's general inventive concept.

The invention claimed is:

1. An airframe structural element comprising:
an airframe structural part; and
a pipe connector element including a conduit for fluid communication through the airframe structural part, wherein the airframe structural part and the pipe connector element form a unitary and one-piece component, are integrally formed prior to the assembly of said airframe structural element into an airframe, and the conduit includes an inner conduit surface configured to be wetted by a fluid and ends of the conduit which are configured to connect to ends of sections of a pipe.

2. The airframe structural element according to claim 1 in which said pipe connector element is a first pipe connector element and is orientated on a first common axis to a second pipe connector element provided on an adjacent second airframe structural part in said airframe, wherein said first and second pipe connector elements are interconnected by a substantially straight pipe.

3. The airframe structural element according to claim 1 in which said pipe connector element comprises a plurality of pipe connector portions wherein each pipe connector portion is orientated on a respective common axis to a pipe connector portion on an adjacent airframe structural element, wherein said portions of said pipe connectors are interconnected by a respective substantially straight pipe.

4. The airframe structural element according to claim 3 in which said first common axis is non-coincident with one or more of said further common axes.

5. The airframe structural element according to claim 1 in which said pipe connector element comprises a plurality of male pipe connectors each on one of the ends of the conduit.

6. The airframe structural element according to claim 1 in which said pipe connector element comprises a male pipe connector on one of the ends of the conduit section and a female pipe connector arranged at least partially within said male pipe connector.

7. The airframe structural element according to claim 1 arranged to provide a predetermined amount of float for connected pipes.

8. The airframe structural element according to claim 7 in which said pipe connector element comprises a stopper arranged to capture said connected pipes between respective ones of the pipe connector elements.

9. The airframe structural element according to claim 1 in which said structural element comprises a rib and said pipe connector element provides a pipe connection through the web of said rib.

10. The airframe structural element according to claim 9 in which said rib is a wing rib.

11. A method for forming an airframe structural element comprising:
forming an airframe structural part;
forming a pipe connector element integrally with said airframe structural part prior to the assembly of said airframe structural element into an airframe such that the pipe connector element and the airframe structural part are a one piece component, wherein said pipe connector element includes a conduit for fluid communication through said airframe structural part and the conduit includes ends and an inner conduit surface between the ends configured to be wetted by a fluid, and
assembling into an airframe the pipe connector element and airframe structural part after formation as the one piece component, wherein the assembly includes connecting the ends of the pipe connector element to pipes configured to transport the fluid.

12. The method according to claim 11 in which said pipe connection element is a first pipe connector element and is orientated on a first common axis to a second pipe connector element provided on an adjacent second airframe structural part in said airframe, wherein said pipe connector elements are interconnected by a substantially straight pipe.

13. The method according to claim 11 in which said pipe connector element comprises a plurality of pipe connector portions, each pipe connector portion is orientated on a respective common axis to pipe connector portion of a further pipe connector element on a respective further airframe structural element, wherein said portions of said pipe connectors are interconnected by a respective substantially straight pipes.

14. The method according to claim 13 in which said first common axis is non-coincident with one or more of said further common axes.

15. The method according to claim 11 in which said pipe connector element comprises male pipe connectors.

16. The method according to claim 11 in which said pipe connector element comprises a male pipe connector and a female pipe connector, wherein said female pipe connector is arranged at least partially within said male pipe connector.

17. The method according to claim 11 arranged to provide a predetermined amount of float for connected pipes.

18. The method according to claim 17 in which said pipe connector element comprises a stopper arranged to capture said connected pipes between respective pipe connector elements.

19. The method according to claim 11 in which said structural element comprises a rib and said pipe connector element provides a pipe connection through the web of said rib.

20. The method according to claim 19 in which said rib is a wing rib.

21. An airframe structural element comprising:
a rib including a web and web feet at opposite edges of the web, wherein the web feet are configured to connect to an airframe; and
a pipe connector element integrally formed with the web such that the rib and pipe connector element are a unitary and single piece, wherein the pipe connector element comprises a conduit including ends configured to connect to pipe sections and an inner conduit surface between the ends configured to be wetted by a fluid flowing through the pipe sections.

* * * * *